United States Patent [19]

Foanio

[11] Patent Number: 5,155,556
[45] Date of Patent: Oct. 13, 1992

[54] HAND-HELD DRILL BIT TESTER

[76] Inventor: Anthony J. Foanio, 441-A S. 6th St., Reading, Pa. 19602

[21] Appl. No.: 737,472

[22] Filed: Jul. 30, 1991

[51] Int. Cl.$^5$ .............................................. G01B 11/00
[52] U.S. Cl. ...................................... 356/397; 33/201; 359/801; 359/804
[58] Field of Search .................. 356/138, 153, 69, 372, 356/388, 397; 33/201, 551; 359/798–804

[56] References Cited

U.S. PATENT DOCUMENTS

| | | | |
|---|---|---|---|
| 1,489,372 | 4/1924 | Steinle | 33/201 |
| 2,794,362 | 6/1957 | Yale | 356/138 |
| 3,116,557 | 1/1964 | Trice, Jr. | 356/153 |
| 4,303,299 | 12/1981 | Clark | 359/391 |
| 4,595,265 | 6/1986 | Hodgson et al. | 359/383 |

FOREIGN PATENT DOCUMENTS 745950 11/1944 Fed. Rep. of Germany ........ 33/201

*Primary Examiner*—F. L. Evans
*Attorney, Agent, or Firm*—Richard C. Litman

[57] ABSTRACT

A compact tester for examining the sharpened end of a twist drill bit for geometrical symmetry and angular relations. The tester includes an optical system for examining the sharpened end; a holder adapted to hold bits of various diameters so that their cylindrical axes coincide with the optical axis; and a reticle having markings which appears to the eye of the user superimposed on the image of the bit end. The holder is a short tube with plural, nesting spiral springs extending from the inside surface of the tube inward. Each spring is a rectangular sheet of spring steel wrapped so as to present a spiral shape when viewed end on. The springs automatically hold bits centered in the bore of the tube, which is aligned with the optical axis. The optical system may be a simple magnifier, or something more sophisticated. The reticle may be a separate flat glass with markings, or, the markings may be put directly onto the magnifier. The markings include concentric lines and radial lines, and means for measuring angular relations. The reticle may be rotated to align it with the bit.

8 Claims, 3 Drawing Sheets

HAND-HELD DRILL BIT TESTER

FIELD OF THE INVENTION

The present invention relates to devices for examining the cutting edges at the end of a twist drill bit for accurate sharpening.

DESCRIPTION OF THE PRIOR ART

Twist drill bits are hardened-steel boring tools, generally cylindrical, with spiral flutes winding about them for removing chips. The cutting edges are ground into the tip or point of the bit. There are universally two flutes, and consequently two sharp cutting edges at the tip.

The cutting edges are formed between the inside surface of a flute and the ground surface at the tip. When the bit becomes dull, it is resharpened. The resharpening is a delicate procedure and requires a complex and expensive fixture to achieve the proper geometry. Because the resharpening fixture may be difficult to set up or may not accept the bit diameter desired to be sharpened, or because the machinist may not know how to use it, bits are often sharpened by hand, using only a grinding stone or wheel. Great skill which can be developed in this, but hand sharpening can never be very precise.

No matter how the bit is sharpened, the geometry must be precise or the drill will not function properly. Even if the bit was sharpened on a fixture, the bit should be checked before use. The present invention is intended for checking the geometrical precision of the bit.

The ground areas at the tip of a properly sharpened bit are of somewhat complex shape. There are two ground primary areas, each extending from the leading or cutting edge of a flute to the trailing edge of the other flute.

The two cutting edges should be exactly equal geometrically. If they are not at similar distances along the bit axis, one edge will cut deeper than the other. This causes overheating and loss of efficiency, and exerts sideways forces on the bit during drilling which cause the hole to be bored imprecisely. If the edges are not radially symmetric (as viewed along the bit axis), eccentric forces will likewise be generated.

The flute surface, part of which makes the cutting edge with the ground area, is shaped so that the leading edge of the flute can make a straight cutting edge. This is shown in FIG. 5, where a twist drill bit is viewed end on (the ground surface is seen from a point along the cylindrical axis of the bit). In FIG. 5, the leading and trailing edges may be identified by the arrow which indicates the sense of rotation of the bit.

The flute is by definition concave: but the concavity is concentrated in the trailing portion of the flute, so that the leading edge part of the flute surface is only slightly curved when viewed along the bit axis, or along the trough line of the flute. (This latter view is only about 30 degrees off the axis of the bit; the angle is the same as the helix angle, between the edge of the flute and a line, parallel to the bit axis, lying along the side of the bit.) The spiral leading flute surface can of course be flat in only one direction: a ruler can be laid flat against it when the ruler extends outward from the bit at right angles, but a ruler cannot be held against it at any other angle.

The ground areas, as seen in FIG. 5, are bordered by the leading cutting edges 102, the trailing edges 104, the chisel edge line 106 between the two ground areas, and the perimeter of the bit. The perimeter comprises four sectors, all edges of cylindrical surfaces. The sectors comprise two pairs, and have two radii. The relieved sectors 112 are of smaller radius. The bore-defining sectors 110, also called the peripheral lands, contact the hole sides. They are narrow to minimize friction and binding.

(The chisel edge line 106 might be curved when viewed from the side, since the round areas are generally conical. The line 106 will be perfectly straight when viewed along the axis, though, if the round areas are symmetrical.)

Depending on the shape of the flutes, the cutting edges 102 may be offset as seen in the view of FIG. 5; but they must be parallel.

Assuming there is no offset, the two cutting edges 102 form an angle, called the point angle, within the plane which includes the edges 102 and the bit axis. The optimum point angle varies with the material to be drilled. In FIG. 5, the edges are seen in a plane perpendicular to the bit axis, so that the point angle is reduced to a line. In the view of FIG. 5, the edges are always disposed 180 degrees apart if the bit is properly symmetrical.

It will be clear upon consideration, that the axially-projected outline of the ground areas, as seen in FIG. 5, will be symmetrical only if the ground areas are spatially symmetrical. In particular, the important cutting edges 102 will be seen as symmetrical when viewed along the bit axis if they are spatially symmetrical in three dimensions.

To see this, consider that the cutting edge 102 of either flute is generally straight because it is the intersection of two surfaces. To a first approximation, the edge 102 is defined by the intersection of the flute surface, which is straight in a direction perpendicular to the bit axis but curved in another sense, and that of the ground surface, which is generally conical (because it is made against a grinding surface which is flat, such as the side of a grindstone (or nearly flat, such as the cylindrical surface of a grindstone which is of a radius much larger than the bit)). Because of the shape of the flute surface, the projected line of the cutting edge 102, as seen in FIG. 5, will vary its position if the ground surface: (1) advances or retreats parallel to the axis of the bit (moves in or out of the FIG. 5 paper) without changing otherwise; or (2) rotates in the plane of the point angle (rotates about a line lying in the plane of the paper which is perpendicular to the cutting edge 102).

Any rotation of a ground surface in the plane of the point angle will change the angle of the corresponding cutting edge line 102. Such rotation, of only one round surface, will also change the position of the chisel edge 106. Only if both ground surfaces rotate together (so that the point angle varies, but the angles made by the bit axis and either cutting edge 102 remain equal) will the chisel edge line 106 remain centered. In this case the cutting edge lines 102 will remain symmetrical but will rotate about the axis, as seen in the view of FIG. 5.

Because the symmetry of the projected view depends on the three-dimensional symmetry of the cutting edges 102 of the ground surfaces, the projected view of FIG. 5 is useful for checking the overall symmetry of the bit in three dimensions.

In addition to checking the symmetry of the cutting edges, this view can also check for proper chisel line angle (the angle formed between the chisel line 106 and a line joining the outer segments of the two cutting edge lines 102. This line passes through the axis of the bit.

The prior art contains several inventions which are intended to check the geometry of the bit tip. None makes full use of the axial view of FIG. 5.

T. A. Ribich, in U.S. Pat. No. 3,231,982, discloses an apparatus for checking cutter geometry. It is intended primarily for milling cutters, rather than twist drills. The apparatus has two magnifiers or microscopes. One has an optical axis which is directed perpendicular to the axis of the cutter. The optical system contains a reticle with angular indicia to measure the helix angle of the peripheral lands (which are common to both twist drills and milling cutters). The other is used merely for magnification, and has an axis not aligned to the geometry of the cutter. To check the angles of the various faces of the cutter, a mechanical "checking block" is aligned to the surfaces, with the microscope acting as an aid to alignment. The angles are read from markings on the checking block support.

Cutters are held in the proper position in a holder or collet, which in turn is held against the inside corner of a vertically aligned V block, thus insuring that the axis of the cutter is vertical. While milling cutters are made in relatively few sizes, the numerous diameters of drill bits would create problems with this arrangement.

Without a separate collet for each drill bit, with each collet having the same outer diameter, the axes of different bits will be in different positions, making it difficult to arrange the Ribich apparatus to look along the axis to see the view of FIG. 5.

The Ribich apparatus is a bulky table-mounted device which includes numerous machined surfaces, and which is expensive to manufacture. The necessity of placing the block against the cutter edge faces invites both imprecision and damage to the sharp edges. The purely optical system for checking the helix angle is of little use in the usual machine shop, since the helix angle is built in at the time of manufacture, is not changed by sharpening, and never needs to be checked in the case of ordinary twist drills.

Another apparatus, for inspecting twist drills, is taught by Jeffrey Silva in U.S. Pat. No. 4,879,813. It checks the concentricity of the chisel ridge edge and the symmetry of the outer corners of the drill flutes. The Silva apparatus is a precision right-angle V block. One end of the V block is cut off flat, at right angles to the line of the V. A references plate is slidably clamped onto this end surface.

In use, the bit is placed into the V and the reference plate is moved about to line up with the chisel edge. The bit is then turned 180 degrees to check that the chisel edge has returned to the same position. The inspection is made by the unaided eye. The axial position of the cutting edge 102 outer corners are also checked, by lining up one of these corners with the flat end face, and checking that the other is also lined up.

The Silva apparatus is small and relatively inexpensive, but it has certain drawbacks. The lack of a magnifier greatly decreases the precision of checking with the Silva apparatus. Also, it does not check the angle which the chisel edge 106 makes with the flutes or cutting edge 102, only the concentricity. It cannot check the angle between the two cutting edges 102.

None of the above inventions and patents, taken either singly or in combination, is seen to describe the instant invention as claimed.

The prior art does not disclose a small, simple and inexpensive device for checking the geometry of twist drill bits.

One object of the present invention, accordingly, is a small, inexpensive, and simple-to-use device for checking the projected view of FIG. 5 for asymmetry and proper angles.

Another object is a device which easily is adapted to a wide range of drill bit diameters.

These and other objects of the present invention will become readily apparent upon further review of the following specification and drawings.

SUMMARY OF THE INVENTION

The present invention, accordingly, is a generally cylindrical bit holder, capable of centering any bit whose diameter is within a range of diameters, combined with a magnifier and a reticle. The bit, reticle and magnifier all share an axis. The magnifier and reticle are arranged for examining the cutting end of a twist drill bit held in the holder. The reticle has indicia for checking the angles between the chisel edge and the cutting edges, and for checking the concentricity of the chisel edge.

The bit holder comprises a number of spiral-wound springs of sheet steel. The springs are each formed of a rectangular sheet rolled into a portion of a spiral. Each spring is fastened to the inside surface of a tube in which the bit is held: the sheet spirals inward toward the axis of the tube. The springs' outer edges are fastened along evenly-spaced lines running along the inside of the tube. All the springs spiral inward in the same sense, so that the various spirals nest and the springs do not touch. The inner edges of all the spiral springs are disposed in parallel lines, each inner edge evenly spaced from its neighboring lines, and all at a common radius from the tube axis.

If the springs are identical then a cylindrical object, such as a drill bit to be examined, can be inserted into the center of the tube in contact with the parallel inner edges of the spiral springs and be held in axial alignment with the tube. The diameter of the object may vary from slightly more than the diameter of the circle described by the inner edges, to a maximum determined by the point at which the spiral springs jam up together or break.

With a bit inserted into the bore of the holder and concentrically held, the cutting end of the bit is viewed through the magnifier and the reticle. The magnifier allows a more precise inspection of the bit in comparison with the markings of the reticle. The bit and the reticle markings are viewed together as combined images.

The reticle has a series of concentric circles. The bit image is first checked to be certain that it is centered in these circles; if it is not, the shank of the bit, which protrudes from the end of the tube, may be forced slightly to one side to center it.

The reticle includes radial lines and angle markings. The reticle may be rotated to align it to the flutes of the bit. Once aligned, the angle of the chisel edge can be checked with the angle indicia.

The rotation mounting of the reticle may incorporate stops 180 degrees apart so that the centering of the chisel edge may be checked in the manner of the Silva invention.

Various embodiments of the optical system may be used with the invention. The simplest uses a simple two-power magnifier lens with the indicia etched directly onto the surface. The indicia can also be placed on a separate reticle near to the bit, and the reticle placed between the bit and the magnifier. More sophisticated designs can also be used.

To light the tip of the bit for viewing, an auxiliary battery powered lamp may be provided. The viewer may be made of transparent plastic for admitting light.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
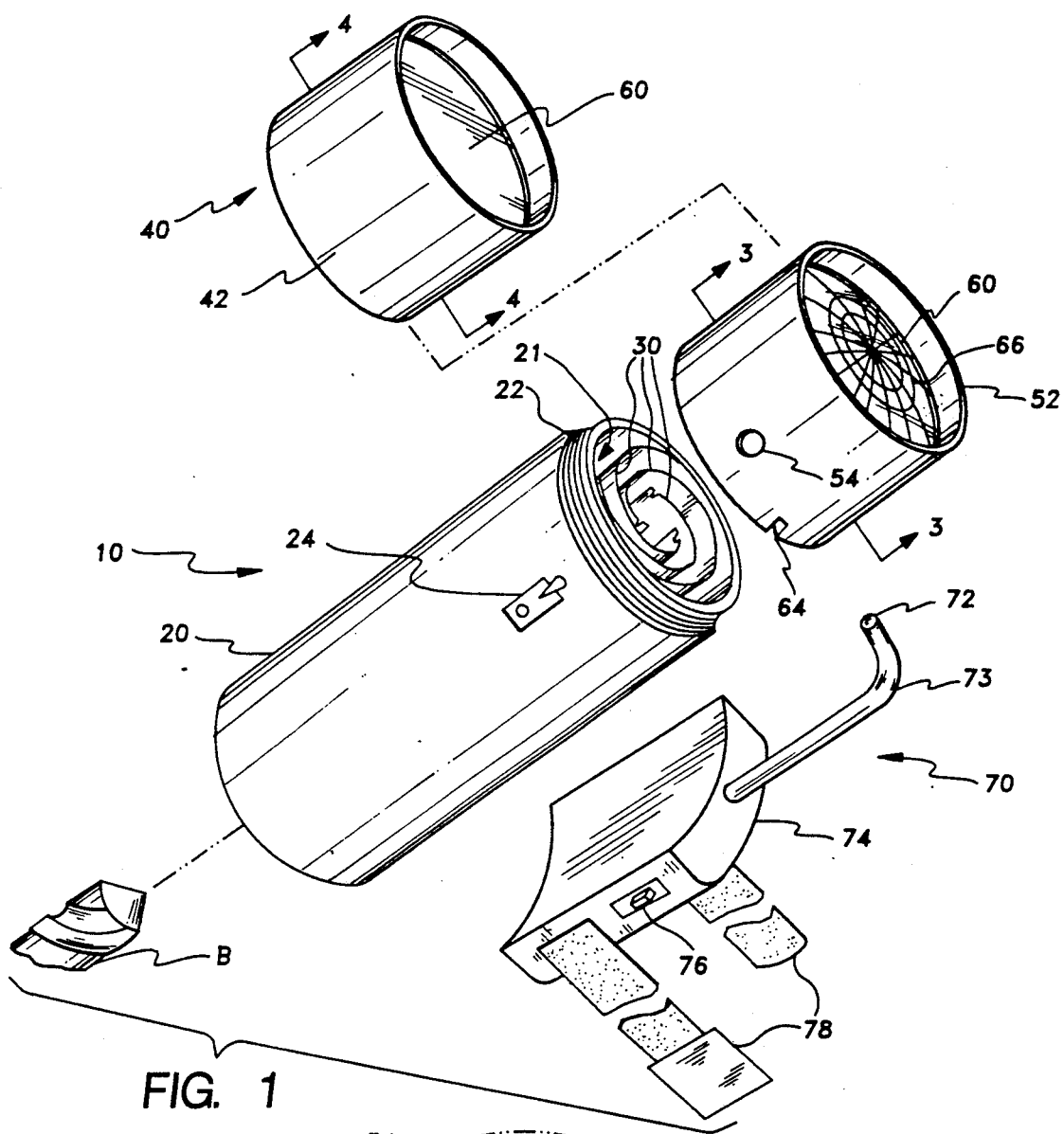
FIG. 1 is a perspective view depicting the present invention partially exploded, and showing two different embodiments of the lens/reticle viewer. A drill bit is shown aligned for insertion into the tube. Spiral springs to hold the bit are visible inside the bore of the tube. An auxiliary lamp with battery pack and strap for holding the pack onto the holder is also shown.

The present invention is shown in overview in FIG. 1. The drill bit B is aligned for insertion into the holder 10. The holder 10 comprises a tube 20 with spiral springs 30 fastened to its inside wall or bore 21.

Figure 2:
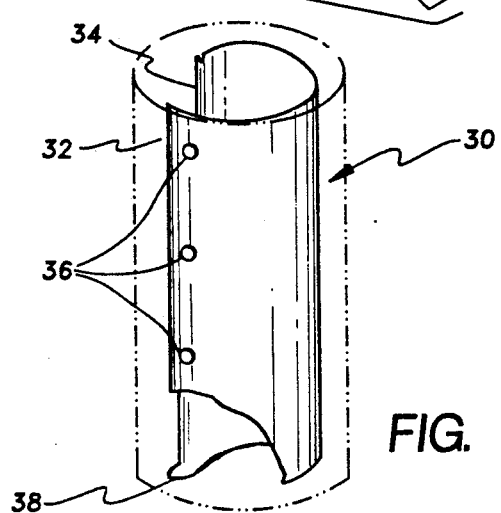
FIG. 2 is a perspective view of one of the spiral springs. The tube is shown in phantom.

One of the springs 30 is shown in FIG. 2. The spring 30 is of resilient sheet material It is fastened to the inside bore 21 of the tube 20 by rivets, spot welds, or the like. As shown in FIG. 2, the outside edge 32 of the spring 30 includes holes 36 for this attachment. From the outside edge 32 the spring 30 spirals inward toward the center. The exact type or shape of the spiral is immaterial, because the plural springs 30 will nest, as shown in FIG. 1, regardless of any special shape.

Each spring 30 will include an inner edge 34 which rests against the bit B when it is inserted into the holder 10. The edge 34 is curled as shown so as not to contact the bit B with a possibly sharp or rough edge of the sheet of metal from which the spring 30 is formed.

It will be appreciated that the springs 30, if evenly disposed angularly around the inside of the tube 20, and shaped identically, will hold a cylindrical object such as the bit B axially aligned within the bore 21 of the tube 20. This is because they will exert equal radial forces on the object only when the object is centered in the bore 21.

Three springs 30 are shown within the bore 21 of the tube 20 in FIG. 1. This is the minimum number to hold the bit B stably within the bore 21; any larger number can be used. The more springs that are used, the less precisely must the springs be matched to center the bit B in the bore. Deviation from the axial position will be roughly proportional to the average (mean) deviation of the inner edges 34 from their common mean distance from the axis; the more there are, the less mean deviation is to be expected.

To ease insertion of the bit B into the holder 10, the springs 30 have outwardly bent portions 38, so that the sharpened edges of the bit B will not catch on the lower spiral edges of the springs 30.

Other sorts of holders may be used. Any which will hold cylinders of various diameters (i.e., drill bits) concentric with a single axis can be used. For example, springs of various other shapes, arranged in radial symmetry, are feasible. Many mechanical systems are possible, such as for example a pair of iris diaphragms of the sort found in camera lenses.

With the bit B inserted and concentrically held in the bore of the tube 20, the bit B end can be inspected with a viewer 40, or an alternate viewer 50. Each viewer 40,50 includes a lens 60 and a reticle.

Figure 3:
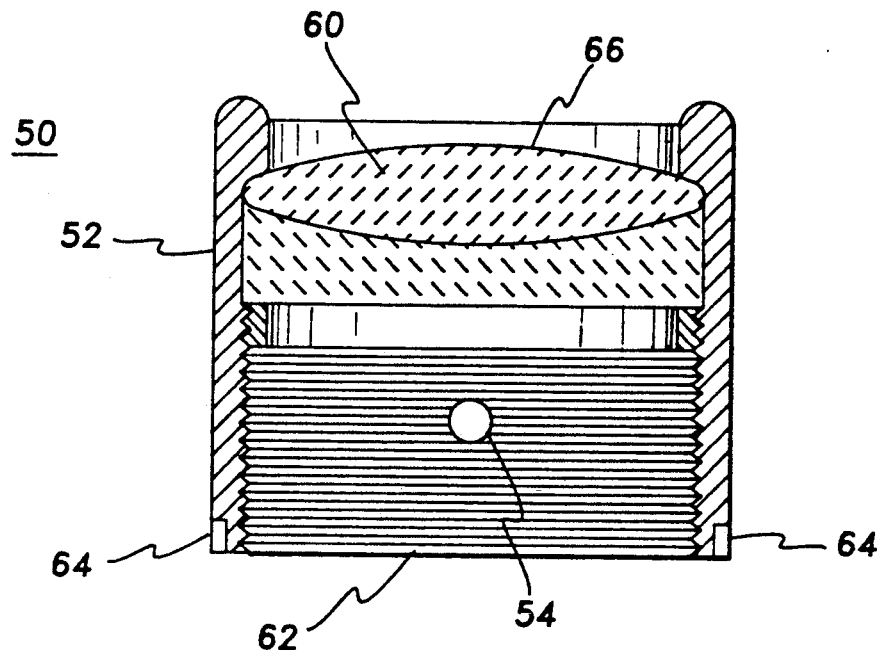
FIG. 3 is a cross section along lines 3—3 of FIG. 1.

The viewer 50 comprises a 2× magnifier (converging lens) with indicia on the outer lens surface, adjacent the user's eye. The viewer 50 is shown in cross section in FIG. 3. A generally cylindrical body 52 may be made of metal or other strong material. The body 52 has internal threads 62 to mate with the external threads 22 on the tube 20 of the holder 10. The body 52 thus can be threadably fastened to the tube 20 to rotate on the tube 20. This allows circle and angle indicia 66 (best shown in FIG. 6) on the outer surface of the lens 60 to be aligned at various angles to the bit B. To limit rotation of the viewer 50 relative to the tube 20, two notches 64 are included on the viewer 50 which interact with a clip 24 on the tube 20. The two notches 64 may be 180 degrees apart to facilitate testing.

More permanent angle stops may also be used, such as a pin protruding from the tube 20 to hit against ledges on the viewer 50.

If the light inside the viewer 50 is insufficient to clearly see the bit, a lamp 70, seen in FIG. 1, can be used to light the bit. The lamp 70 includes a light bulb 72 which can be inserted through a hole 54 in the side of the body 52. The bulb 72 may be of the type used in small flashlights. The bulb 72 is mounted at the end of a stalk 73 extending from a housing and battery container 74, which includes a switch 76 and a strap 78 for attaching the lamp 70 to the holder 10.

Figure 4:
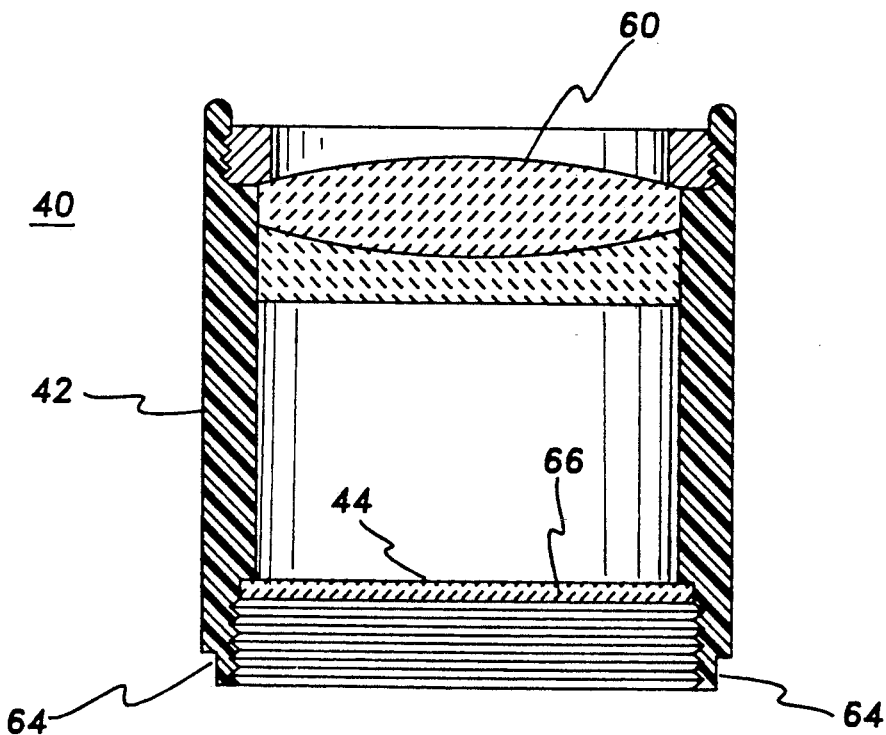
FIG. 4 is a cross section along lines 4—4 of FIG. 1.
Figure 5:
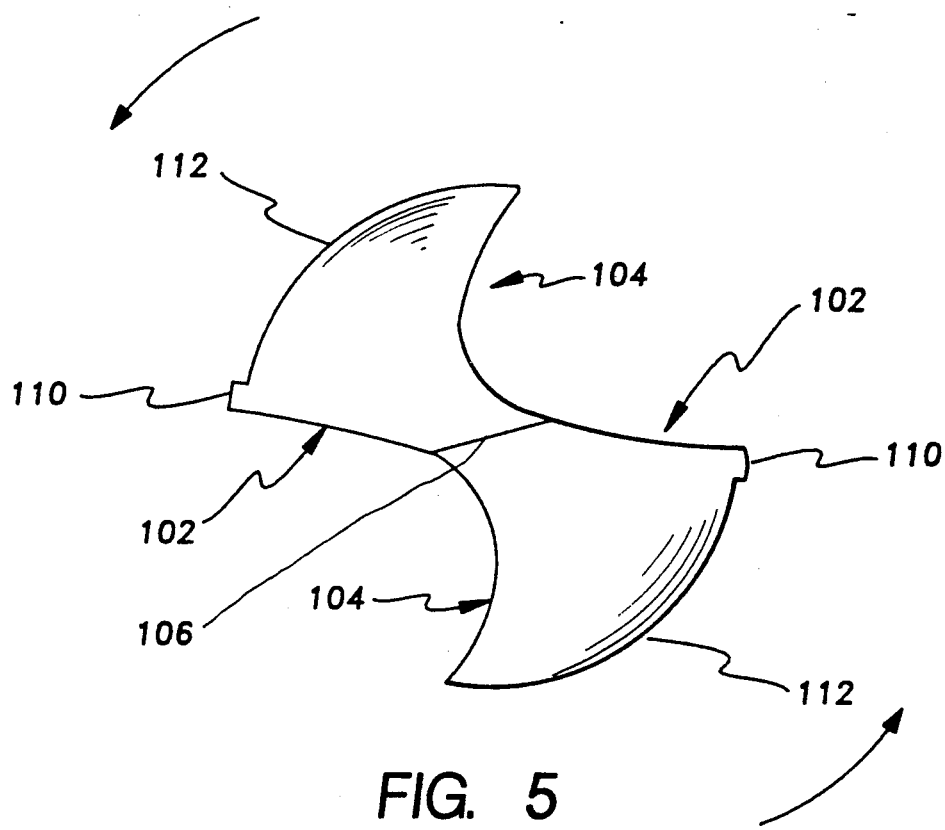
FIG. 5 shows a twist drill bit end-on, as viewed along the axis.

An alternate viewer 40 is shown in FIG. 1, and in cross section in FIG. 4. This embodiment of the viewer shares parts with the first embodiment: the lens 60, threads 62, and notches 64. However, the viewer 40 includes a separate reticle 44, whereon the angle and concentricity indicia 66 are disposed. This reticle 44 is preferably a flat glass plate with indicial markings. The location of the indicia distant from the lens 60, where it may be closely adjacent to the bit B, makes it easier for the user's eye to focus on the bit and on the markings simultaneously.

The viewer 40 has a body 42 made of transparent plastic, so that ambient light can illuminate the bit. Consequently the lamp 70 can be omitted from this viewer 40.

More sophisticated viewers are also within the scope of the invention, for example, an optical system with two focal planes having the object in one plane and the reticle in the other plane, like a telescopic sight (in which the cross hairs and the target are both seen superimposed and in focus). Any optical system having lenses, and a reticle with indicia, is within the scope of the invention.

"Reticle" as used herein means any means for placing indicia over an image used in conjunction with a lens, not only a glass surface with markings.

The optical axis of the lens system should of course be lined up coincident with the axis of the bit. The optical axis could be deflected by a mirror or other reflecting surface, or offset by prism or the like, if this were useful in the particular design of the optical system. In other words, the optical axis should coincide with the bit's cylindrical axis where the optical axis enters the bit; but the user's line of sight need not be on the axis of the bit, since the optical axis may bend.

Figure 6:
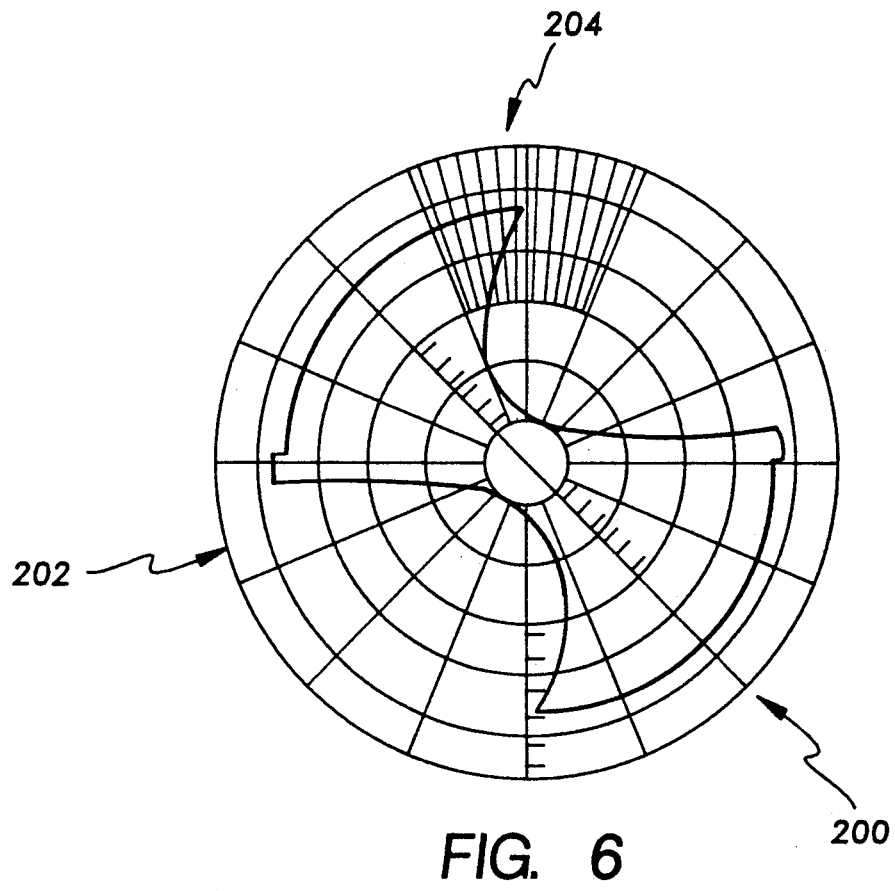
FIG. 6 shows the bit as it appears when viewed through the lens and reticle of the present invention.

With the bit B in the holder 10 and one of the viewers 40, 50 screwed onto the tube 20, the user will see the bit B superimposed on the markings 66. This is shown in FIG. 6. The markings include radial lines to show angles, and concentric circles. The circles should be centered on the bit; otherwise the angle measurements will not be valid. If the bit is not so centered, the user may nudge the shank of the bit which protrudes from the end of the tube 20 distal the viewer 40, 50 to center it.

The radial line markings of the indicia include a main cross line 200 with radial subdivisions, and angular subdivisions in both fractional markings 202 and decimal markings 204.

The markings may be used to check the angle of the chisel edge line 106, and to see if a line between the outside ends of the cutting edge lines 102 passes through the center of the bit, as it should.

Other indicia may be used. The invention is not limited to the particular markings or type of markings shown in FIG. 6. The viewer 40 may be adapted to accept various reticles to be substituted for the radial-angle reticle.

It is to be understood that the present invention is not limited to the sole embodiment described above, but encompasses any and all embodiments within the scope of the following claims.

I claim:

1. A drill bit tester for examining a generally cylindrical bit having a bit axis, comprising:
    a viewer for examining a sharpened end of the bit, including an optical system having an optical axis extending through said viewer from the sharpened end toward a viewing end, at which viewing end a user may see an image of the sharpened end;
    a holder attached to said viewer for holding the bit in an aligned position wherein the bit axis coincides with said optical axis;
    a plurality of deflectable members concentrically arranged around a tube axis of said holder coaxial with said optical axis in equal angular dispositions and attached to an inner surface of said holder, said members exerting equal forces toward said tube axis when deflected equally therefrom, whereby said forces are radially balanced to hold the bit in a position wherein the bit axis coincides with said optical axis; and
    reticle means having markings simultaneously visible with said image of the sharpened end through said viewing end; whereby
    said markings may be used to examine the geometry of the sharpened end.

2. The tester according to claim 1, including
means for rotating said reticle means about said optical axis to angularly align said marking to the sharpened end.

3. The tester according to claim 1, including
illumination means for lighting the sharpened end.

4. The tester according to claim 1, wherein
said markings include concentric rings centered on said optical axis.

5. The tester according to claim 1, wherein
said markings include radial lines passing through said optical axis.

6. The tester according to claim 1, wherein
said markings include means for angular measurement.

7. The tester according to claim 1, wherein
said image of the sharpened end is magnified.

8. The tester according to claim 1, wherein:
said holder comprises a cylindrical tube having a hollow bore forming said inner surface, and including said tube axis;
said deflectable members are spirally wound sheets of resilient material; and
said deflectable members are each attached along one straight edge to said bore, said one straight edge being parallel to said tube axis.

* * * * *